Jan. 11, 1927.                              1,613,595
W. T. ABEL
METHOD OF MAKING METAL ARTICLES
Filed Jan. 21, 1925

Inventor:
Walter T. Abel,
by Parker Cook
Atty.

Patented Jan. 11, 1927.

1,613,595

UNITED STATES PATENT OFFICE.

WALTER T. ABEL, OF WATERBURY, CONNECTICUT, ASSIGNOR TO THE PATENT BUTTON COMPANY, OF WATERBURY, CONNECTICUT, A CORPORATION OF CONNECTICUT.

METHOD OF MAKING METAL ARTICLES.

Application filed January 21, 1925. Serial No. 3,768.

My invention relates to new and useful improvements in small, soft metal articles and to the method of making the same, and more particularly to a one-piece metal article that is a small replica of a ham. In an application filed by me on the 23rd day of October, 1924, bearing Serial Number 745,329, which has resulted in Patent Number 1,570,324, of January 19, 1926, a very similar method was shown for producing or forming a one-piece metal button. In that instance, a combined heading and extruding process was used, but only a portion of the metal blank used was extruded, a remaining portion used to form the hub of the button.

In the present instance the plunger or extruding die is of a greater length or has a greater movement so that all of the metal is extruded by the plunger and forced into the die block to form the shank of the little metal ham.

Another object of the invention is to provide a method wherein the small metal novelties in the shape of a ham may be made from metal blanks at a very high rate of speed and in but two die blocks, one of which is provided with an extruding die or plunger. After the little ham is so made, a small hole may be drilled in the shank so that it may be attached to a ham or may be worn as a small novel watch charm.

Although the little ham is shown as presenting a smooth surface on one of its faces, this face may have stamped therein, the dealer's name and brand to thus identify the ham to which it is attached and inasmuch as the little ham is to be made from a blank of pure aluminum, it may be safely attached to either fresh or smoked meat without any danger of contaminating the meat.

In the present application, as in the former one, an article of this kind made in the method about to be described, will possess clean cut features and edges, and although there may be a tiny burr or a small ring left on the face of the article, this may be easily removed by subjecting the article after it comes from the dies to a tumbler which will remove this burr and also tend to polish the small article.

In the invention about to be described, the small ham may be quickly and accurately formed as the upper end of the die cavity is slightly restricted, this portion of the die forming the shank of the ham while the greater portion of the metal is in the rounded portion of the ham. In other words, only a lesser part of the blank has to be forced in the upper end of the forming dies.

With these and other objects in view, the invention consists in certain new and novel arrangements and combination of parts as will be hereinafter more fully described and pointed out in the claims.

Referring now to the drawings, forming a part of this application,

Figure 1:
Fig. 1 is a view in elevation of the first stage blank.
Figure 2:
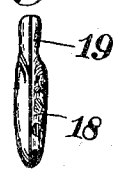
Fig. 2 is a side elevation of the replica of a ham formed from the blank.
Figure 3:
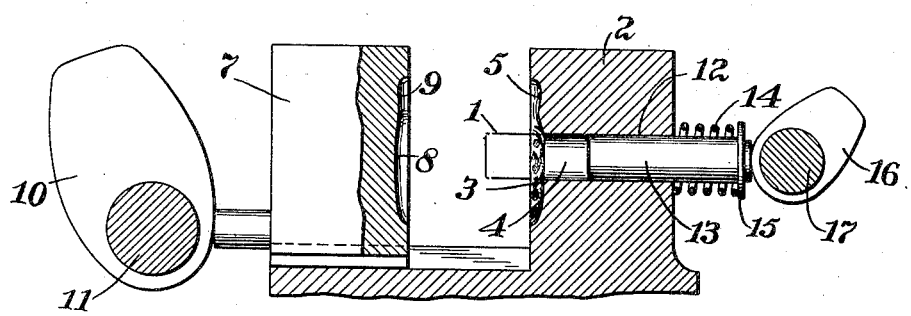
Fig. 3 is a view in longitudinal section of the dies and supplementing mechanism for transforming the first stage blank into the miniature metal ham, the dies being illustrated in their separated or open position.

Referring now more in detail to the drawings, there is shown a blank 1 of metal which is preferably pure aluminum in wire or rod-like form and the length and thickness of the same will be correctly predetermined. Mechanism that is regularly employed in heading machines will move this blank into the position shown by dotted lines in Fig. 3. The die blocks illustrated in Fig. 3 consist of the stationary block 2 having the chamber or cavity 3 formed therein, and the restricted or neck portion 5 shown at the upper end of the cavity 3. This chamber or cavity 3 will be engraved or stamped to produce the irregular surfaces 6 as may be seen on the face of the ham in Fig. 7.

A second and slidably movable die block 7 is also shown which is provided with the cavity or chamber 8, which also has a restricted upper portion 9, these two chambers or cavities arranged to register when the dies are forced together. The die block 7 is illustrated as being operated by a cam 10 on a shaft 11 although it will be understood that this mechanism may be modified in any way to produce the proper movement of the die block 7.

Referring again to the die block 2 it will be seen that a longitudinal bore or opening 12 is shown through which extends a plunger or extruding die 13 on which is a small spring 14 held in place by a fixed washer 15 and this is to be operated by a cam 16 on a shaft 17. In this connection it is to be understood that other mechanisms, such as a crank arm and suitable linkage might be employed to produce the desired motion and timing of the extruding die or plunger 13.

The cams 10 and 16 are connected through suitable gearing (not shown) wherein the movable die block 7 will approach and contact with the guide block 2 and will remain in this position for a small interval of time to allow the extruding die or plunger 13 to be forced rapidly forward and then withdrawn by the aforementioned spring 14.

Figure 4:
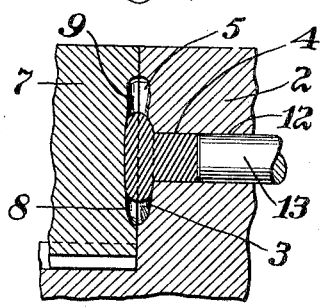
Fig. 4 is a similar view showing the die blocks having been forced together, but prior to the movement of the extruding plunger.
Figure 5:
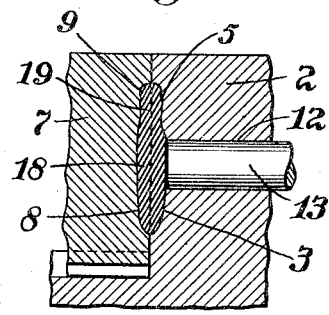
Fig. 5 is a similar view after the extruding plunger has been moved inwardly forcing all of the metal between the two die blocks.
Figure 6:
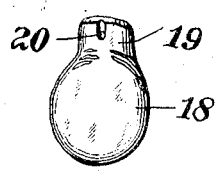
Fig. 6 is a view of the rear face of the ham.

The mechanism being arranged in this way, the operation is a relatively simple one. The blank will be moved into the position shown in dotted lines in Fig. 3 after which the movable block 7 will be moved towards the die block 2 and the blank will then assume the shape as clearly shown in Fig. 4, a portion of the metal being compressed as there shown, and the remainder of the blank still extending within the hub portion 4. After the blank has assumed this shape, the plunger 13 will be moved rapidly to force the metal completely into the cavity 3 and 8 of the die blocks and, of course, upwardly into the restricted portions 5 and 9 of the cavities.

The die blocks will then separate and the small metal article 18 in the shape of a ham will have been formed having the restricted portion 19 which resembles the shank of a ham and through which a small opening 20 may afterwards be drilled.

As beforementioned, one face of the ham will present a plane surface, or rather a smooth surface on which may be stamped or pressed a suitable inscription, and this may be done in the above operation by inscribing the insignia or data in the face or bottom of the cavity 8 of the die block 7 and various die blocks may be kept on hand having different insignia engraved therein.

Figure 7:
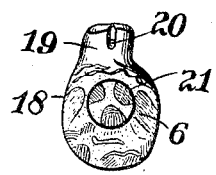
Fig. 7 is a front face, the ring formed by the plunger being slightly exaggerated.

As will be noticed from Fig. 7, the opposite face of the ham will be provided with small indentations and raised portions to simulate the natural appearance of a smoked ham. A small ring 21 will appear on this face where the plunger 13 has forced or extruded the metal into the dies, but the small hams may be subjected to a tumbler provided with small cylinders or shot or other abrading articles to thereby remove any small burr or roughness on the article.

From the foregoing it will be seen that I have provided a method for producing a small novelty that is pleasing in appearance, and may be made at a relatively high speed, it being possible to produce these at a rate of a hundred to a hundred and fifty a minute.

Furthermore, the metal will flow evenly into the two cavities of the dies and by the extruding action will be forced tightly against the edges of the cavities and upwardly into the restricted portion to provide an article remarkably free from burrs or fins.

It will be seen that I displace the metal first for about half the length of the blank, and afterwards cause it to be completely forced from the hub of the die into the cavities or chambers of the dies.

It will be understood from the foregoing that the little hams may be made as described, but I do not wish to be limited in my method to just the formation of articles representing little hams, as other small articles of different contour and shape might just as well be made with the above method. The shape of the dies, of course, will be the controlling factors as to the size and appearance of the articles manufactured.

Having thus described my invention, what I claim as new and desire to secure by Letters Patent is:—

1. A method of forming an article comprising a body having a restricted projection integral therewith which consists in subjecting a rod-like blank to the action of heading dies and only partially forming the body and leaving a portion extending at right angles to the body forming a shank, subjecting the shank portion of the blank to the action of a plunger while the heading dies are closed to thereby displace all the metal of the shank and cause it to flow into the body and also form the restricted projection to thereby complete the article.

2. A method of forming an article comprising a body having a restricted end portion which consists in subjecting a rod-like blank to heading dies having a restricted portion at one end thereof partially forming the body and leaving a portion of the rod-like blank in the form of a shank, subjecting the shank to the action of a plunger while the heading dies are closed to thereby force all the metal from the shank into the body and to force a part of the metal of the body into the restricted portion of the dies to thereby complete the article.

In testimony whereof I affix my signature.

WALTER T. ABEL.